Oct. 30, 1962     W. C. BRASIE     3,060,505
EXTRUSION DIE
Filed Dec. 19, 1960
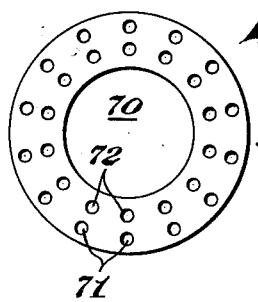
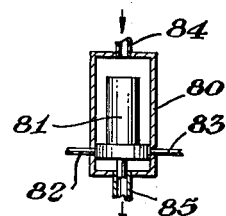
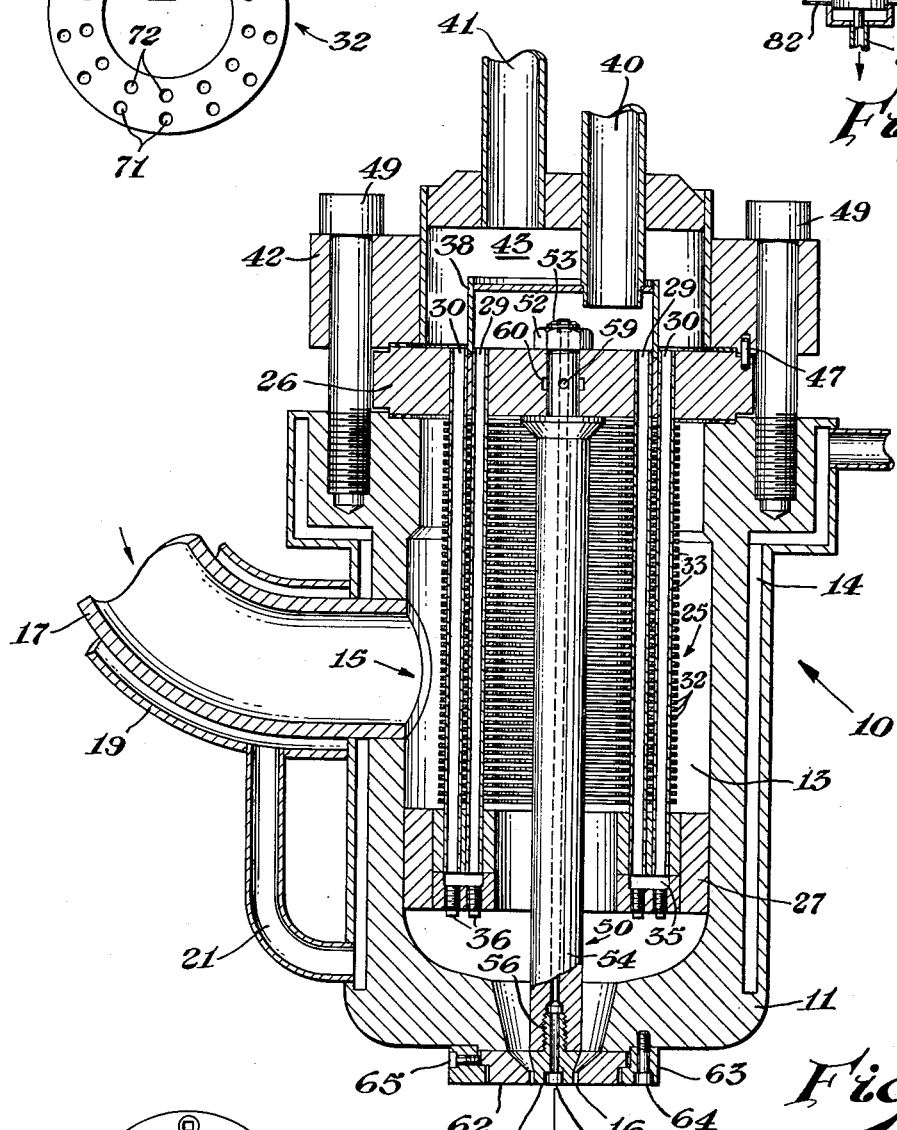
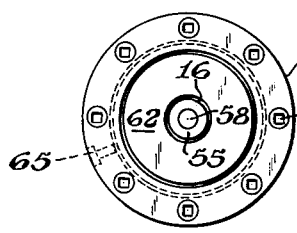
INVENTOR.
William C. Brasie
BY Robert B. Ingraham
AGENT United States Patent Office 3,060,505
Patented Oct. 30, 1962

3,060,505
EXTRUSION DIE
William C. Brasie, Midland, Mich., assignor to The Dow Chemical Company, Midland, Mich., a corporation of Delaware
Filed Dec. 19, 1960, Ser. No. 76,604
3 Claims. (Cl. 18—12)

This invention relates to an extrusion die and more particularly relates to an extrusion die for the formation of thermoplastic resinous tubular articles.

Numerous and varied types of extrusion dies are available for the formation of tubular articles. These dies are frequently unsatisfactory for the extrusion of tubes which are subsequently inflated by means of fluid pressure to form thin films. Satisfactory thin films must have a relatively high degree of geometric uniformity; that is, variations in thickness give rise to many difficulties in the fabrication and utilization of the film into the finished article and also create great difficulties in the winding and storage of mill rolls. Non-uniformities of wall thickness of tubular plastic articles prepared by the inflation of a relatively thick tube depends on the mechanical clearances present in the annular opening of the die and are extremely sensitive to any temperature variations which may exist in the polymer while being extruded. Various mixing and cooling systems are employed to precondition and provide a polymer feed stock having uniform temperature distribution. However, such systems are not found to be entirely satisfactory. Much difficulty is encountered in maintaining and controlling a uniform average temperature throughout the polymeric material being extruded. For successful preparation of film by the bubble process, extremely close temperature tolerances must be maintained, and, with minor variations in feed stock, corresponding changes should be made in polymer temperature. Such phenomena as nonuniformity and overshoot in temperature control give rise to appreciable and significant quantities of commercially unsatisfactory product and corresponding loss of revenue. Further irregularities are caused in the extruded tubes by the supports employed to position the internal mandrel supporting the interior die lips. These support members or spider webs separate the flowing stream of molten material and cause a memory or weld line in the extruded tube.

It is therefore an object of this invention to provide an integral extrusion die and heat exchanger assembly for the extrusion of thermoplastic resinous tubes.

A further object of the invention is to provide a die which will produce a film or tube free of memory or weld lines.

It is a still further object of this invention to provide an extrusion die assembly which will permit relatively rapid changes in the temperature of the material to be extruded.

These objects and other desirable benefits may be achieved by employing a diehead assembly comprising a shell having a polymer inlet and an annular polymer outlet, a multiplicity of fluid plate-like heat exchanger members having an aperture in the center uniformly assembled perpendicularly to the longitudinal axis of said shell with a space of generally the same magnitude between each of the individual plate members; said plate members being positioned in close proximity to one another to thereby provide a flow path for the extrude between adjacent plate members in a thin sheet, said multipilicity of said plate members being encompassed by said shell with the inner walls of said shell being at a distance from the outer periphery of said plates to provide an opening between said inner wall and the outer periphery of said plate members communicating with the inlet of said shell and the annular outlet generally coaxially disposed and communicating with the central aperture of said plate members; a mandrel extending into and terminating generally parallel to said outlet and centrally positioned within the apertures of said plates and means to change the temperatures of said plate members.

These objects and other advantages of the invention will be more apparent in the following description and specification taken in connection with the accompanying drawing wherein:

FIGURE 1 is a cross sectional view of a die assembly in accordance with the invention.

FIGURE 2 is a detailed elevation of one of the plates used in the die head of FIGURE 1.

FIGURE 3 is an end view of the die assembly of FIGURE 1.

FIGURE 4 is a schematic representation of an alternate flow pattern which may be employed in a die assembly in accordance with the invention.

With reference to FIGURE 1, the extrusion die assembly is generally indicated by the reference numeral 10 and is comprised of a generally cylindrical shell 11 defining an internal cavity 13 and an annular jacket space 14. An inlet 15 and a generally axially positioned outlet port 16 are provided in the shell 11. The inlet port 15 is in communication with an inlet conduit 17 having a jacket 19 communicating with the annular space 14 by means of conduit 21. A heat exchanger assembly generally indicated by the reference numeral 25 is axially positioned within the shell 11. The heat exchanger 25 comprises an upper tube sheet 26, a lower tube sheet 27, joined together by inner tubes 29 and outer tubes 30. The tubes 29 and 30 have affixed a plurality of closely spaced heat exchanger plate members 32 which are in intimate contact with tubes 29 and 30 and have a space 33 separating the adjacent plate members 32. The tube sheet 27 is provided with an internal annular chamber 35 communicating with tubes 29 and 30, and is axially aligned with the tubes 29 and 30. The plugs 36 prevent communication between chamber 35 and the exterior orifice 16. The upper openings of the tubes 29 and 30 are separated from each other by an inner shell 38 in full communication with coolant conduit 40 and chamber 43 in communication with conduit 41. A head member 42 is positioned by means of dowel pin 47. The head 42 is fixed to the shell 11 by means of cap screws 49. A mandrel, generally indicated by the reference numeral 50 is centrally positioned within the heat exchange member 25 and secured to the upper tube sheet 26 by means of nut 52 and the stud 53. The body of the mandrel 54 carries the inner die lip member 55 by means of internal thread arrangement 56. A passageway 58 is provided within the body of the mandrel 50 extending in a generally axial direction and terminating in port 59, located in the side of the stud 53 and in full communication with the annular groove 60, in communication with a passageway (not shown), extending laterally through and to the periphery of tube sheet 26. At the base of shell 11 and surrounding the inner die lip member 55 is the outer die lip member 62, secured to the shell 11 by retainer ring 63, cap screws 64, and adjusting screw 65.

FIGURE 2 is an elevation of one of the flat plate members 32 having a central aperture 70 and a plurality of outer peripherally disposed apertures 71 attached to engage tubes 30 and a plurality of inner apertures 72 engaged to tubes 29.

In FIGURE 4 there is schematically illustrated an alternate flow pattern configuration which may be employed in apparatus in accordance with the invention, wherein the polymeric feed is introduced axially with respect to the mandrel and the temperature controlling liquid is fed to the tube sheets radially. This embodiment comprises a shell or housing 80 containing a heat exchanger and mandrel assembly 81 having cooling lines 82 and 83. Molten polymer is fed to the shell 80 through feed line 84 and is subsequently discharged at the opposite end of the shell 80 as tube 85.

The axial feed embodiment of FIGURE 4 is particularly advantageous when especially viscous melts are extruded. A symmetrical polymer flow is attained which further contributes to the uniformity of the extruded tube. Such considerations are, of course, dependent on the melt viscosity of the polymer, the clearance between the shell and the heat exchanger unit and the pressure drop across the heat exchanger element. The inline embodiment of FIGURE 4 is a particularly advantageous when maximum flow symmetry is required for high viscosity material and minimum shell size is desirable. The configuration of FIGURE 1 is preferable if available height is limited (as is frequently the case with vertical up or down extrusion), with lower viscosity melt, where rapid die assembly and disassembly is required.

Highly viscous liquid polymeric material is introduced through conduit 17 into the annular chamber 15 surrounding the heat exchange element 25. The polymeric material then flows through the spaces 33 between the heat exchange elements 32 parallel to the axis of the mandrel 50 and out through the annular opening 16. Heat exchange fluid is introduced through one of the ports 40 or 41 and removed from the other. The heat exchange fluid has a clear path of communication through the tubes 30, the annular chamber 35, tubes 29, to the conduit 40. The flat plate elements 32 are in close engagement with the tubes 29 and 30, thus providing a good thermal path. Air or other relatively inert fluid is introduced to the annular chamber 60 through the port 59 into the passageway 58, which is in communication with the interior of the tube (not shown) extruded from the annular die orifice 16. The heat exchange fluid supplied to the internal exchanger is also fed to the space between conduit 17 and jacket 19 which is in communication with the annular jacket space 14 and is discharged from the jacket.

In operation, a diehead of the invention permits the temperature control of the extruded polymer to be maintained within a range of less than 3 degrees centigrade, that is, the total variation or temperature gradient throughout the extruded polymer mass will not exceed 3 degrees centigrade. This range is maintained without the use of high precision instrumentation. A smaller temperature variation is attained by employing more rigid control of the cooling medium temperature.

Typically, the start-up time of a conventional extrusion unit is between 3 and 4 hours. The start-up time employing an extrusion head (of comparable extrusion rate) in accordance with the invention is reduced to about 15 minutes. This is believed to be due to the reduced inventory time in the heat exchange die assembly. The conventional bubble type of extrusion apparatus requires an inventory of about 1 hour of supply material, whereas a head in accordance with the invention requires only 10 minutes total inventory.

In a typical extrusion operation, molten polystyrene was fed to a diehead in accordance with the invention at a temperature of about 205–210 degrees centigrade. Water, at a temperature of between 150 and 152 degrees centigrade, was circulated in the heating exchanger tubes, with a total pressure drop in the polymer feed system across the extrusion head of 650–700 pounds per square inch gauge and the temperature of the extrude to be varied only between 152–153 degrees centigrade. Inspection of the extruded tube revealed that superior uniformity of wall section was obtained when compared to tube obtained from conventional extrusion equipment. For example, in conventional extrusion equipment an extreme variation of ±20 percent was obtained when extruding a 1 mil film. When the conventional extrusion head was replaced by one in accordance with the invention, the variation was only ±10 percent.

The apparatus of the invention is equally adaptable when employed with other polymeric materials, such as polyethylene, polypropylene, polyvinyl chloride, and other similar materials.

The diehead assembly of the invention may be constructed from any of the conventional constructional materials, such as steel, stainless steel bars, aluminum, and the like, the choice being predicated upon the material to be extruded. Various methods are available for fabrication of the heat exchanger section. Individual plates may be formed and press fitted to the tubes. Spacers may be employed to maintain uniform spacing between the plate members. The assembly may be welded, brazed, or soldered to provide mechanical rigidity and maintain a good thermal path. Alternately the heat exchanger assembly may be machined from a piece of bar or mechanical tubing of suitable size. The heat exchanger fluid channels may be drilled or bored and the plate members formed by slitting or milling.

This invention may be embodied in several forms without departing from the spirit or essential characteristics thereof. The foregoing embodiments are therefore merely illustrative and not restrictive thereof.

I claim:
1. An extrusion diehead assembly comprising a shell having a polymer inlet and an annular polymer outlet, a multiplicity of fluid plate heat exchanger members having an aperture in the center, said plate members uniformly assembled perpendicularly to the longitudinal axis of said shell with a space of generally the same magnitude between each of the individual plate members; said plate members being positioned in close proximity to one another to thereby provide a flow path for the extrude between adjacent plate members in a thin sheet; said multiplicity of said plate members being encompassed by said shell with the inner walls of said shell being at a distance from the outer periphery of said plate members to provide an opening between said inner wall and the outer periphery of said plate members communicating with the inlet of said shell and said annular outlet generally coaxially disposed and communicating with the central aperture of said plate members; a mandrel extending into and terminating generally parallel to said outlet and centrally positioned within the apertures of said plate members and means to change the temperatures of said plate members.

2. The diehead assembly of claim 1, wherein the means to change the temperature of the plate members comprises a plurality of open tubes passing through perforations in said plate members and secured thereto, having headers attached to each end of said tubes, said headers having openings through which the heat exchange fluid may be introduced and removed after passing through the two tubes to change the temperature of the plate members.

3. The diehead assembly of claim 1, wherein the axis of the said polymer inlet port and said annular polymer outlet port are generally colinear.

References Cited in the file of this patent

UNITED STATES PATENTS

| 1,066,341 | Thomson | July 1, 1913 |
| 1,876,256 | Maynard | Sept. 6, 1932 |
| 2,461,630 | Cozzo | Feb. 15, 1949 |
| 2,690,592 | Schanz | Oct. 5, 1954 |